(12) United States Patent
De L. M. Arias et al.

(10) Patent No.: US 11,794,379 B2
(45) Date of Patent: Oct. 24, 2023

(54) TURNING SYSTEM FOR WIND TURBINE BLADE PARTS

(71) Applicant: LM WIND POWER A/S, Kolding (DK)

(72) Inventors: Maria De L. M. Arias, Kolding (DK); Rune Brøgger Hahn, Kolding (DK); Ivan Kaab Mosegaard, Kolding (DK)

(73) Assignee: LM WIND POWER A/S, Kolding (DK)

( * ) Notice: Subject to any disclaimer, the term of this patent is extended or adjusted under 35 U.S.C. 154(b) by 0 days.

(21) Appl. No.: 17/786,184

(22) PCT Filed: Mar. 16, 2021

(86) PCT No.: PCT/EP2021/056680
§ 371 (c)(1),
(2) Date: Jun. 16, 2022

(87) PCT Pub. No.: WO2021/185834
PCT Pub. Date: Sep. 23, 2021

(65) Prior Publication Data
US 2023/0012725 A1    Jan. 19, 2023

(30) Foreign Application Priority Data

Mar. 18, 2020  (GB) ...................... 2003921

(51) Int. Cl.
*B29C 33/26*  (2006.01)
*B29D 99/00*  (2010.01)
(Continued)

(52) U.S. Cl.
CPC .......... *B29C 33/26* (2013.01); *B29D 99/0028* (2013.01); *B29C 33/306* (2013.01); *B29L 2031/085* (2013.01)

(58) Field of Classification Search
CPC ....... B29C 33/26; B29C 33/28; B29C 33/306; B29D 99/0028; Y02E 10/72; B29L 2031/085; Y02P 70/50
See application file for complete search history.

(56) References Cited

U.S. PATENT DOCUMENTS

| | | | |
|---|---|---|---|
| 9,889,580 B2 * | 2/2018 | Andersen | ................ B29C 33/28 |
| 2014/0084514 A1 * | 3/2014 | Hardwicke | ........... B29C 33/306 |
| | | | 425/383 |
| 2021/0231097 A1 * | 7/2021 | De L. M. Arias | .... F03D 1/0675 |

FOREIGN PATENT DOCUMENTS

| | | |
|---|---|---|
| CN | 201456277 U | 5/2010 |
| CN | 205615027 U | 10/2016 |

(Continued)

*Primary Examiner* — Ryan J. Walters
(74) *Attorney, Agent, or Firm* — Nath, Goldberg & Meyer; Jerald L. Meyer; Tanya E. Harkins

(57) ABSTRACT

A turning system for turning wind turbine blade shell part carriers between an open position and a closed position about a turning axis, comprising:
a lower blade shell part carrier having a support surface for receiving and supporting a lower wind turbine blade part;
an upper blade shell part carrier and having a support surface for receiving and supporting an upper wind turbine blade part; and
at least one turning device each including:
a lower hinge element, such as a beam, arranged under the support surface of the lower blade shell part carrier; and
a turning hinge having a lower hinge part attached to the respective lower hinge element, an upper hinge part attached to the upper blade shell part carrier, and an actuator configured for turning the lower and upper hinge parts relative to each other about the turning axis.

20 Claims, 7 Drawing Sheets

(51) Int. Cl.
*B29C 33/30* (2006.01)
*B29L 31/08* (2006.01)

(56) References Cited

FOREIGN PATENT DOCUMENTS

| CN | 108145993 A | 6/2018 |
|---|---|---|
| DE | 202010014682 U1 | 2/2011 |
| WO | 2016/083504 A1 | 6/2016 |

\* cited by examiner

TURNING SYSTEM FOR WIND TURBINE BLADE PARTS

This is a National Phase Application filed under 35 U.S.C. 371 as a national stage of PCT/EP2021/056680, filed Mar. 16, 2021, an application claiming the benefit of Great Britain Application No. 2003921.0, filed Mar. 18, 2020, the content of each of which is hereby incorporated by reference in its entirety.

TECHNICAL FIELD

The present disclosure relates to a turning system for turning wind turbine blade parts, a method for turning wind turbine blade parts, and a method for exchanging a turning system.

BACKGROUND

Wind turbine blades have become increasingly longer over the years and may today have a length of 80 metres or more and may weigh tens of tons. The wind turbine blades are often manufactured as separate shell parts, e.g. as a pressure side shell part and a suction side shell part, which afterwards are assembled to form a complete aerodynamic blade shell. This can be carried out at an assembly station via blade shell part carriers, for instance at a manufacturing station via the mould parts, in which the shell parts are manufactured, or at a post-moulding station via two cradles for receiving and supporting the blade shell parts.

After moulding, the shell parts are assembled by gluing the shell parts at the leading edge and the trailing edge which require that the upper blade shell part carrier is turned over along with the carried blade shell part and aligned with the lower mould part and lower blade shell part. Therefore, the assembly station is provided with a turning system comprising a number of turning devices that allow the upper blade shell part carrier to be turned over and closed against the lower blade shell part carrier. An example of a turning device is shown in WO 2016/083504.

It should be mentioned that this definition of "upper" or "lower" for corresponding parts is used throughout this disclosure and allow distinguishing corresponding parts by referring to the position of the parts in the position wherein the upper blade shell part carrier is placed on top of and closes the lower blade shell part carrier.

Before such turning devices are mounted to the blade shell part carriers, it is important that the lower blade shell part carrier is sufficiently levelled by inserting shims under the feet of the lower mould part which is a time-consuming process before bolting the lower blade shell part carrier to the factory floor. The upper blade shell part carrier is then positioned on top of and closes the lower blade shell part carrier.

Then typically, a number of locations for mounting a turning device along the length of lower blade shell part carrier mould is selected and a lower carrier connector beam and an attached lower adapter beam are loosely placed in a supporting frame of the lower blade shell part carrier at each location.

A corresponding number of turning hinges is placed adjacent to each adapter beam. A hinge flange of each lower adapter beam is then levelled and positioned in a common plane, and then aligned with and attached to a corresponding flange of each turning hinge each having their turning axis coinciding with each other. The lower carrier connector beams are then welded onto the supporting frame of the lower blade shell part carrier and thus the lower blade shell part carrier acts as a counterweight for the turning hinge. Then, an upper carrier connector beam and an attached upper adapter beam are loosely placed in a supporting frame of the upper blade shell part carrier and a hinge flange of each upper adapter beam is mounted to the corresponding turning hinge thus forming the turning device. The upper carrier connector beams are then welded onto the supporting frame of the upper blade shell part carrier. This assembly of the turning system is time-consuming and requires skilled workers.

The turning devices then turn the upper blade shell part carrier so that the blade shell part carriers open and are placed adjacent to each other on the factory floor ready to receive wind turbine blade shell parts.

Typically, a wind turbine blade factory will produce wind turbine blades of several different lengths and thus when changing blade manufacturing to a different size, the above process is repeated with different sized blade shell part carriers onto which different sized carrier connector beams and adapter beams are welded and mounted to turning devices. As mentioned, this is a very time-consuming process which reduces the flexibility to change blade production.

SUMMARY

On this background, it may be seen as an object of the present disclosure to provide a turning system with a turning device which is flexible to use with multiple blade shell part carrier configurations. Another object of the present disclosure is to provide a method of preparing a turning system which is flexible and quicker. Yet another object of the present disclosure is to provide a method of exchanging a turning system which is quicker and less labour intensive.

One or more of these objects may be met by aspects of the present disclosure as described in the following.

A first aspect of this disclosure relates to a turning system for turning wind turbine blade shell part carriers between an open position and a closed position about a turning axis, comprising:
- a lower blade shell part carrier extending along a first longitudinal axis and having a support surface for receiving and supporting a lower wind turbine blade part;
- an upper blade shell part carrier extending along a second longitudinal axis and having a support surface for receiving and supporting an upper wind turbine blade part, the support surfaces of lower and upper blade shell part carriers being able to receive a respective blade shell part in the open position and the support surface of the upper blade shell part carrier is turned over on the support surface of the lower blade shell part carrier in the closed position; and
- at least one turning device each including:
  - a lower hinge element, such as a beam, arranged at least partly under the support surface of the lower blade shell part carrier; and
  - a turning hinge having a lower hinge part attached to the respective lower hinge element, an upper hinge part attached to the upper blade shell part carrier, and an actuator configured for turning the lower and upper hinge parts relative to each other about the turning axis.

Additionally or alternatively, each lower hinge element may be configured for being secured to a stationary surface, such as a factory floor, so that the lower hinge element secures the respective turning hinge to the stationary surface when the blade shell part carriers are turned between the open and closed position.

By having each lower hinge element acting securing the respective turning hinge instead of the lower blade shell part carrier acting as a counterweight, the strength requirement of the lower blade shell part carrier may be reduced, thus enabling savings in material. Further, the securement of each lower hinge element may eliminate or reduce the need for individually welding each lower hinge element to the blade shell part carrier as each lower hinge element will be a stationary part of the factory. Thus, each lower hinge element can be reused for several carrier setups which saves time and cost in carrier setup.

Additionally or alternatively, each lower hinge element may comprise a first portion extending under the support surface of the lower blade shell part carrier, e.g. under a centre of gravity of the lower blade shell part carrier and a second portion extending on a side of the lower blade shell part carrier. The second portion of each lower hinge element may be attached to the respective turning hinge. Additionally or alternatively, each lower hinge element may extend transversely to the turning axis and/or the longitudinal axis of the lower blade shell part carrier.

Additionally or alternatively, the stationary surface may be any permanent surface forming part of the surroundings of the turning system, such as a factory floor. The stationary surface may be a concrete floor.

Additionally or alternatively, each lower hinge element may comprise one or more feet configured to be secured to the stationary surface. Each lower hinge element may be secured to the stationary floor via bolts, preferably anchor bolts.

Additionally or alternatively, each lower hinge element may be configured to be secured directly to the stationary surface.

Additionally or alternatively, each turning hinge may be arranged between the blade shell part carriers in the open position and/or at one side of the blade shell part carriers in the closed position.

The turning axis may be parallel to the first and/or the second longitudinal axis.

Additionally or alternatively, each blade shell part carrier may be configured to support a respective wind turbine blade shell part along a majority or the entirety of its length.

Additionally or alternatively, the support surface of each blade shell part carrier may comprise a tip portion for supporting a tip of the respective wind turbine blade shell part and a root portion for supporting a root of the respective wind turbine blade shell part.

Additionally or alternatively, each blade shell part carrier may comprise a supporting frame configured for supporting the support surface on the stationary surface. The support frames may comprise one or more feet optionally configured for being secured to the stationary surface.

Additionally or alternatively, each turning device may further comprise a lower detachable elbow element, such as an elbow beam, attaching the lower hinge element to the lower hinge part.

Providing a lower elbow element between the lower hinge element and the lower hinge part allows the turning system to adapt to different sized turning hinges and blade shell part carriers.

Additionally or alternatively, the lower hinge element may be attached to the detachable elbow element via a first joint and/or the lower hinge part may be attached to the detachable elbow element via a second joint.

Such joint(s) may provide the advantage of flexibility in attaching the elbow element to the respective parts.

Additionally or alternatively, the first joint may be a first bolted flange joint and/or the second joint may be a second bolted flange joint.

Additionally or alternatively, a centre of the first joint and/or second joint may be located at a predetermined horizontal distance and/or a predetermined vertical distance from the turning axis.

By locating joint(s) at predetermined distances to the turning axis, the blade shell part carriers and hinge element(s) can be designed towards these distances and thus a standard adapter element can be provided for each different turning hinge. This reduces the number of specific parts required. This may also help minimising the blade shell part carrier setup and/or exchanging time.

Additionally or alternatively, the lower blade shell part carrier may be movable relative to the lower hinge element.

This may provide the advantage of allowing adjustment of the position of the lower blade shell part carrier relative to each lower hinge element.

Additionally or alternatively, the lower blade shell part carrier may be detached from each lower hinge element.

Additionally or alternatively, the turning system may comprise, at each lower hinge element, a detachable attachment interface with a first interface part forming part of the lower blade shell part carrier and a second interface part forming part of the respective lower hinge element, wherein the first interface part and second interface part is configured to interlock or is interlocking.

Additionally or alternatively, the detachable attachment interface may comprise at least one actuator configured for displacing the lower blade shell part carrier relative to the lower hinge element in at least one direction, preferably three perpendicular directions.

Additionally or alternatively, the at least one actuator, optionally three actuators, may be configured for displacing the lower blade shell part carrier relative to the lower hinge element in three perpendicular directions. This allows levelling of the lower blade shell part carrier to be performed by the turning system. The actuator(s) may be hydraulic or electrical actuator(s). The detachable attachment interface may be configured to allow a displacement of 5-10 mm in each direction.

Additionally or alternatively, the turning system may comprise at least two of the hinge elements, at least two turning hinges, at least two detachable attachment interfaces, and a controller controlling the displacement of the detachable attachment interface of each hinge element. The detachable attachment interface may comprise a lever configured to detach the attachment interface upon manipulation.

Additionally or alternatively, the turning axis may be at a predetermined height from the stationary surface, the predetermined height preferably being in the range of 2 metres to 4 metres, preferably 2.3 metres to 2.7 metres or 3.5 metres to 4.0 metres. A height in such a range allows using the turning system with a wide variety of carrier sizes.

Additionally or alternatively, a height between the turning axis and a centre of the first joint may predetermined, preferably in the range of 1.5 metres to 3.5 metres, more preferably in the range of 1.7 metres to 2.1 metres or in the range of 3.0 metres to 3.5 metres. A height in such a range allows using the turning system with a wide variety of carrier sizes.

Additionally or alternatively, the at least one turning device may be a plurality of turning devices spaced along the first longitudinal axis.

Additionally or alternatively, the upper blade shell part carrier may be an upper mould for manufacturing a wind turbine blade part, such as an upwind or downwind part of a wind turbine blade, and wherein the lower blade shell part carrier may be a lower mould for manufacturing a wind turbine blade part, such as an upwind or downwind shell part of a wind turbine blade.

Additionally or alternatively, the upper and lower moulds may be upper and lower female moulds.

A second aspect of this disclosure relates to a method of preparing a turning system for turning wind turbine blade shell part carriers between an open position and a closed position, the method comprising the steps of:
- providing a turning system according to the first aspect or a turning system comprising:
  - a lower blade shell part carrier having a support surface for receiving and supporting a lower wind turbine blade part,
  - an upper blade shell part carrier having a support surface for receiving and supporting an upper wind turbine blade shell part, the support surfaces of lower and upper blade shell part carriers being able to receive a respective blade shell part in the open position and the support surface of the upper blade shell part carrier is turned over on the support surface of the lower blade shell part carrier in the closed position,
  - at least one turning device each including
    - a lower hinge element, such as a beam, and
    - a turning hinge having a lower hinge part, an upper hinge part, and an actuator configured for turning the lower and upper hinge parts relative to each other about a turning axis,
- securing each lower hinge element to a stationary surface, such as a factory floor,
- positioning the lower blade shell part carrier over each lower hinge element,
- attaching each lower hinge element to the lower hinge part of the respective turning hinge, and
- attaching the upper hinge part of each turning hinge to the upper blade shell part carrier so that the at least one turning hinge can move the blade shell part carriers between the open position and closed position.

Additionally or alternatively, the method may be a method of turning an upper blade shell part carrier onto a lower blade shell part carrier further comprising the step of causing the actuator of each turning hinge to turn the upper blade shell part carrier onto the lower blade shell part carrier.

Additionally or alternatively, the method may further comprise a step of:
- levelling the lower blade shell part carrier, optionally via inserting one or more shims between the lower blade shell part carrier and the stationary surface, preferably performed after the step of positioning the lower blade shell part carrier over each lower hinge element.

Additionally or alternatively, the method may further comprise a step of:
- placing the upper blade shell part carrier on the lower blade shell part carrier so the blade shell part carriers are in a closed position, preferably performed after the levelling step.

A third aspect of this disclosure relates to a method for exchanging a first turning system for turning a first pair of blade shell part carriers about a first turning axis between an open position and a closed position with a second turning system for turning a second pair of blade shell part carriers about a second turning axis between the open position and the closed position, the support surfaces of the blade shell part carriers being able to receive a respective blade shell part in the open position and the support surfaces of the blade shell part carriers forming a continuous support surface in the closed position, the method comprising the steps of:
- providing a turning system according to the first aspect, the blade shell part carriers being a first pair of blade shell part carriers for supporting blade shell parts of a first blade length, the at least one hinge element being secured to the stationary surface under the lower blade shell part carrier,
- detaching the upper hinge part of the turning hinge from the upper blade shell part carrier,
- removing the first pair of blade shell part carriers,
- providing a second pair of blade shell part carriers including:
  - a lower blade shell part carrier having a support surface for receiving and supporting a lower wind turbine blade shell part for a wind turbine blade of a second blade length, and
  - an upper blade shell part carrier having a support surface for receiving and supporting an upper wind turbine blade shell part for a wind turbine blade of a second blade length, the second blade length being different from the first blade length,
- positioning the lower blade shell part carrier of the second pair over each lower hinge element, and
- attaching the upper hinge part of each turning hinge to the upper blade shell part carrier of the second pair.

This may provide the advantage that the lower hinge elements can be used for different sized blade shell part carriers which reduces the number of specific components for each blade shell part carrier setup.

Additionally or alternatively, the first turning axis of the first turning system and the second turning axis of the second turning system may coincide optionally at a predetermined height preferably being in the range of 2 metres to 4 metres, more preferably 2.3 metres to 2.7 metres or 3.5 metres to 4.0 metres.

Additionally or alternatively, the turning device may comprise a lower detachable elbow element as in the first aspect and a height between the first and second turning axes and a centre of the first joint may be predetermined, preferably in the range of 1.5 metres to 2.5 metres, more preferably 1.7 metres to 2.1 metres.

A person skilled in the art will appreciate that any one or more of the above aspects of this disclosure and embodiments thereof may be combined with any one or more of the other aspects of this disclosure and embodiments thereof.

BRIEF DESCRIPTION OF THE DRAWINGS

Embodiments of this disclosure will be described in more detail in the following with regard to the accompanying figures. The figures show one way of implementing the present invention and are not to be construed as being limiting to other possible embodiments falling within the scope of the attached claim set.

FIG. 7a is a schematic top view illustrating two wind turbine blade parts of different lengths FIG. 7b is a schematic top view illustrating a turning system with turning devices of FIG. 5b for manufacturing the different sized wind turbine blades of FIG. 7a,

DETAILED DESCRIPTION OF THE INVENTION

Figure 1:
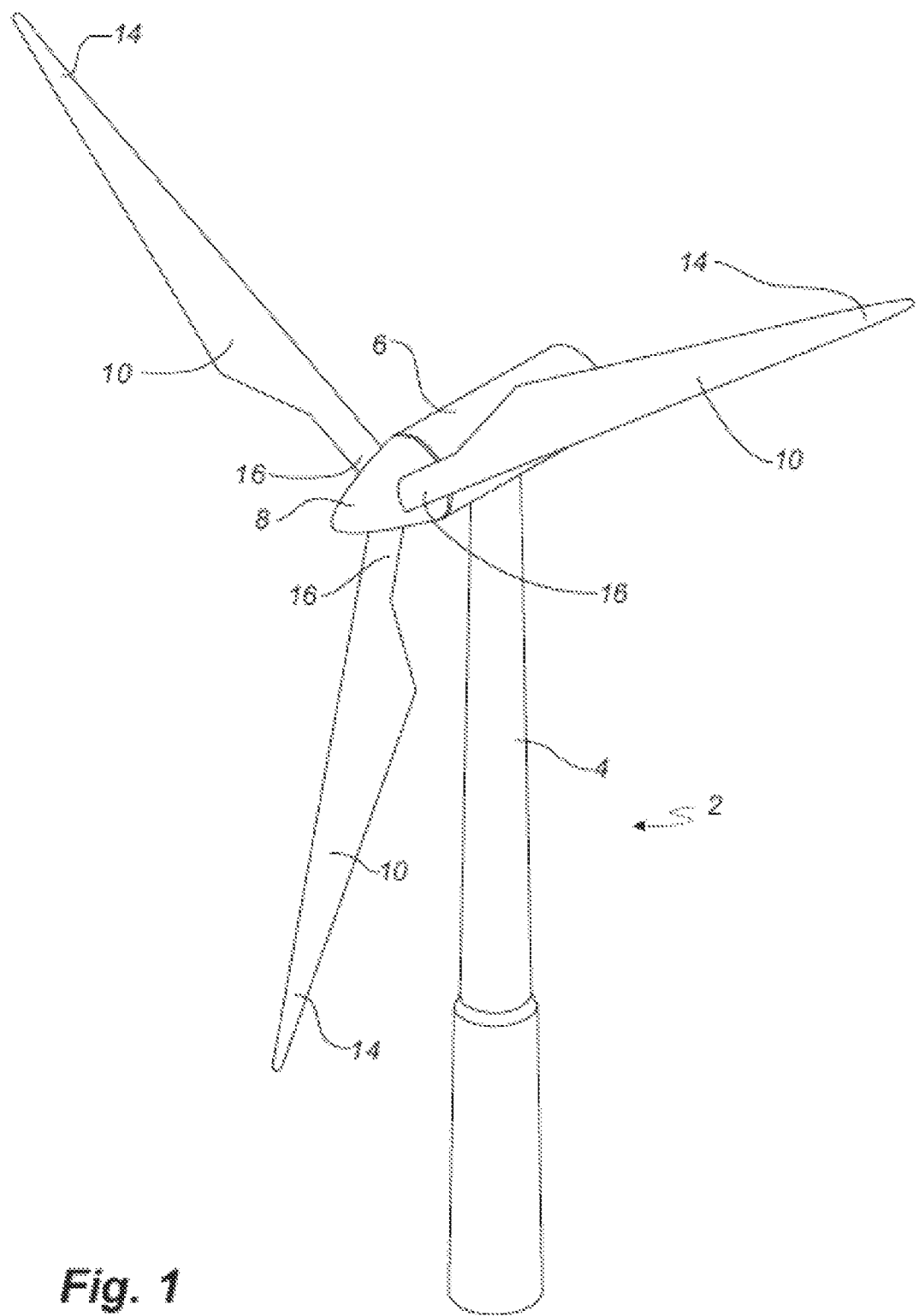
FIG. 1 is a schematic perspective view illustrating an exemplary wind turbine.

FIG. 1 illustrates a conventional modern upwind wind turbine 2 according to the so-called "Danish concept" with a tower 4, a nacelle 6, and a rotor with a substantially horizontal rotor shaft. The rotor includes a hub 8, and three blades 10 extending radially from the hub 8, each having a blade root 16 nearest the hub and a blade tip 14 furthest from the hub 8.

Figure 2:
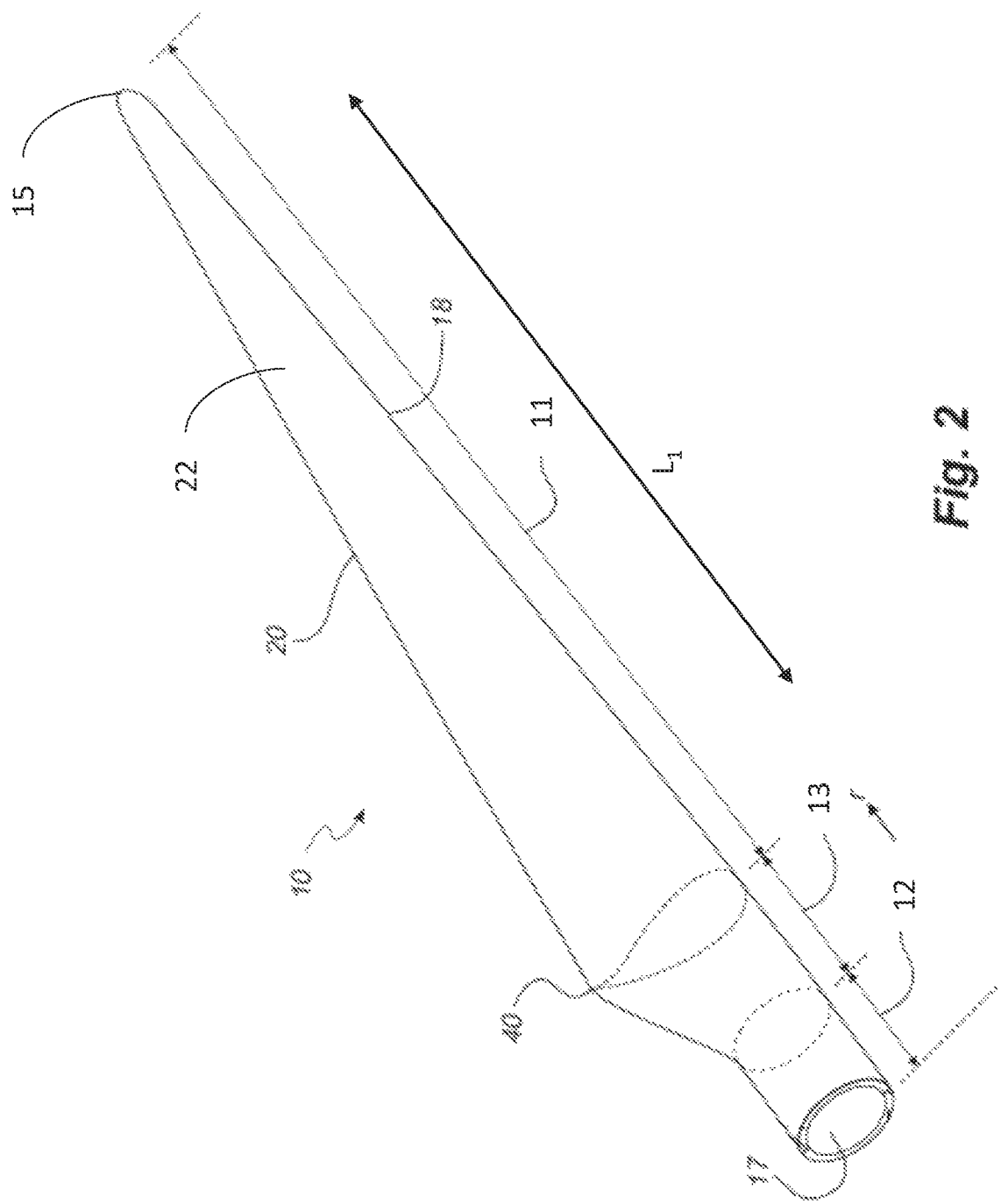
FIG. 2 is a schematic perspective view illustrating an exemplary wind turbine blade.

FIG. 2 shows a schematic view of an exemplary wind turbine blade 10. The wind turbine blade 10 extends along a longitudinal axis $L_1$ with a root end 17 and a tip end 15 and has the shape of a conventional wind turbine blade which comprises a root region 12 closest to the hub, a profiled or an airfoil region 11 furthest away from the hub and a transition region 13 between the root region 12 and the airfoil region 11. The blade 10 comprises a leading edge 18 facing the direction of rotation of the blade 10, when the blade is mounted on the hub, and a trailing edge 20 facing the opposite direction of the leading edge 18. The blade 10 comprises a pressure side 22 between the leading edge 18 and the trailing edge 20 facing the incoming wind when mounted on the hub and a suction side on the opposite side of the blade 10. The airfoil region 11 (also called the profiled region) has an ideal or almost ideal blade shape with respect to generating lift, whereas the root region 12 due to structural considerations has a substantially circular or elliptical cross-section, which for instance makes it easier and safer to mount the blade 10 to the hub. The diameter (or the chord line) of the root region 12 may be constant along the entire root region 12. The transition region 13 has a transitional profile gradually changing from the circular or elliptical shape of the root region 12 to the airfoil profile of the airfoil region 11. The chord line of the transition region 13 typically increases in length with increasing distance r from the hub. The airfoil region 11 has an airfoil profile with a chord line extending from the leading edge 18 to the trailing edge 20 of the blade 10. The length of the chord line decreases with increasing distance r from the hub. A shoulder 40 of the blade 10 is defined as the position, where the blade 10 has its largest chord length. The shoulder 40 is typically provided at the boundary between the transition region 13 and the airfoil region 11. It should be noted that the chord lines of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 is manufactured as a pressure side shell part and a suction side shell part, which afterwards are assembled to form a complete aerodynamic blade shell.

Figure 3:
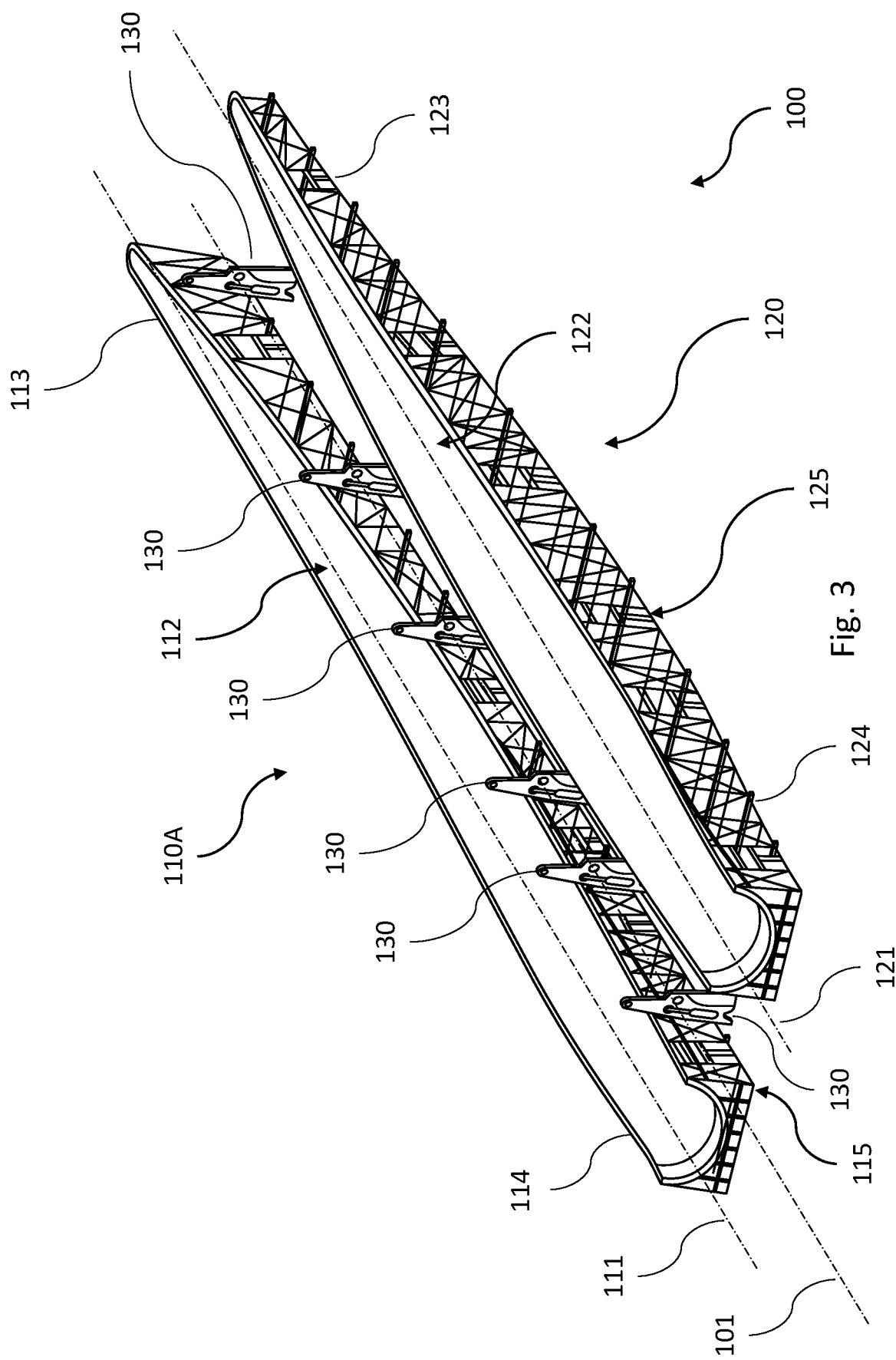
FIG. 3 is a schematic perspective view illustrating a turning system for manufacturing a wind turbine blade.

For this purpose, a turning system 100 as illustrated in FIG. 3 is provided. The turning system comprises a lower blade shell part carrier 110 in the form of a lower female mould, an upper blade shell part carrier 120 in the form an upper female mould, and a plurality of turning devices 130 which in FIG. 3 numbers six. The blade shell part carriers 110, 120 respectively extend along a longitudinal axis 111, 121 from a tip portion 113, 123 to a root portion 114, 124 and comprise a support surface 112, 122 in the form of a mould surface for manufacturing and supporting one of the pressure and suction side shell parts along the entirety of its length, and a supporting frame 115, 125 supporting the support surface 112, 122 on a stationary surface 50 in the form of a concrete factory floor via the feet 116 as best seen in FIG. 5a.

Figure 4:
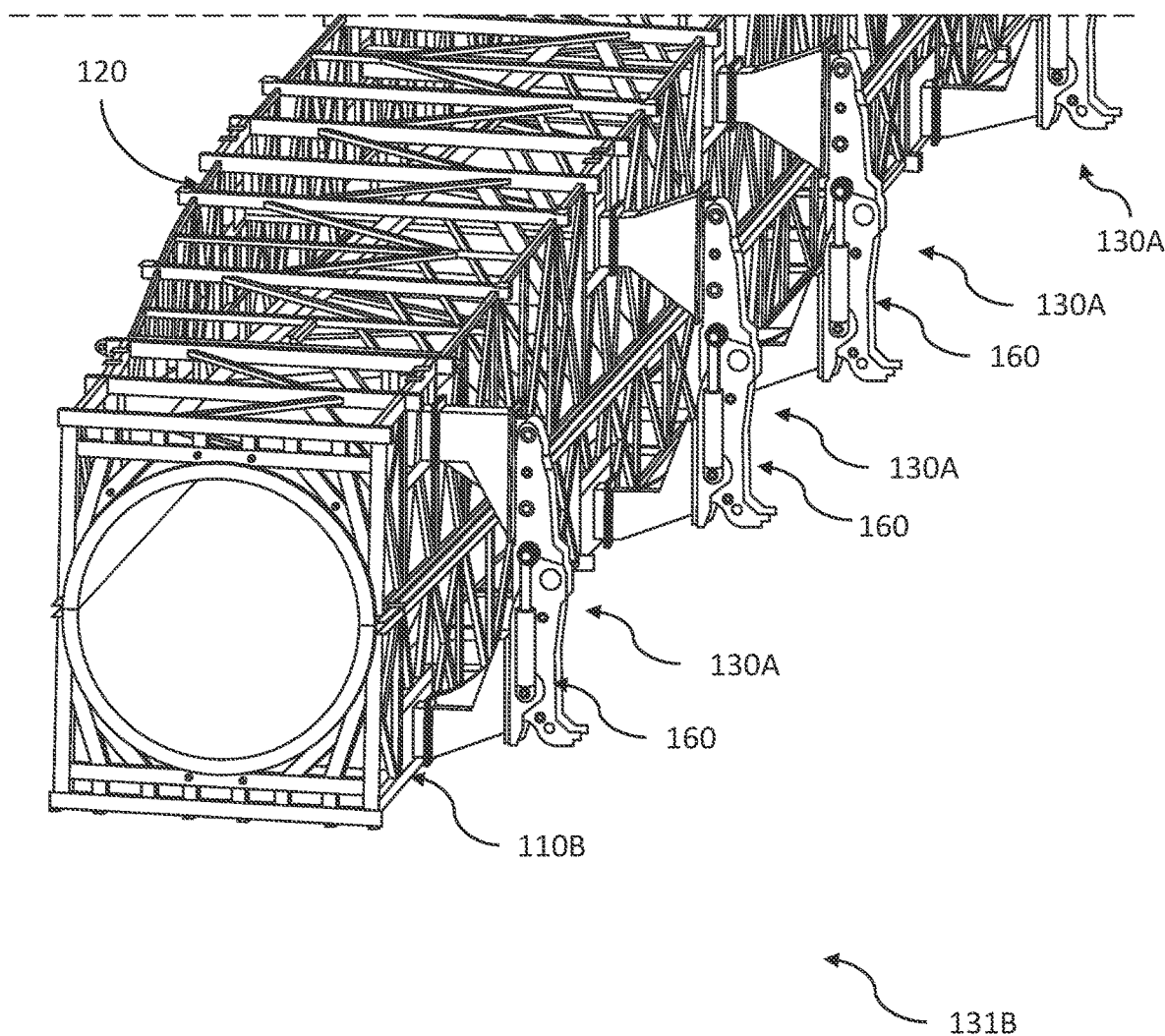
FIG. 4 is a schematic perspective view illustrating the turning system of FIG. 3 in a closed position.

The turning system 100 can turn wind turbine blade shell part carriers 110, 120 about a turning axis 101 parallel to the first and second longitudinal axes 111, 121 between an open position in which the support surfaces 112, 122 of lower and upper blade shell part carriers 110, 120 are able to receive or mould a respective blade shell part as shown in FIG. 3 and a closed position in which the support surface of the upper blade shell part carrier is turned over on the support surface of the lower blade shell part carrier as shown in FIG. 4 to allow gluing leading and trailing edges of the blade shell parts and forming an assembled wind turbine blade shell.

Figure 5A:
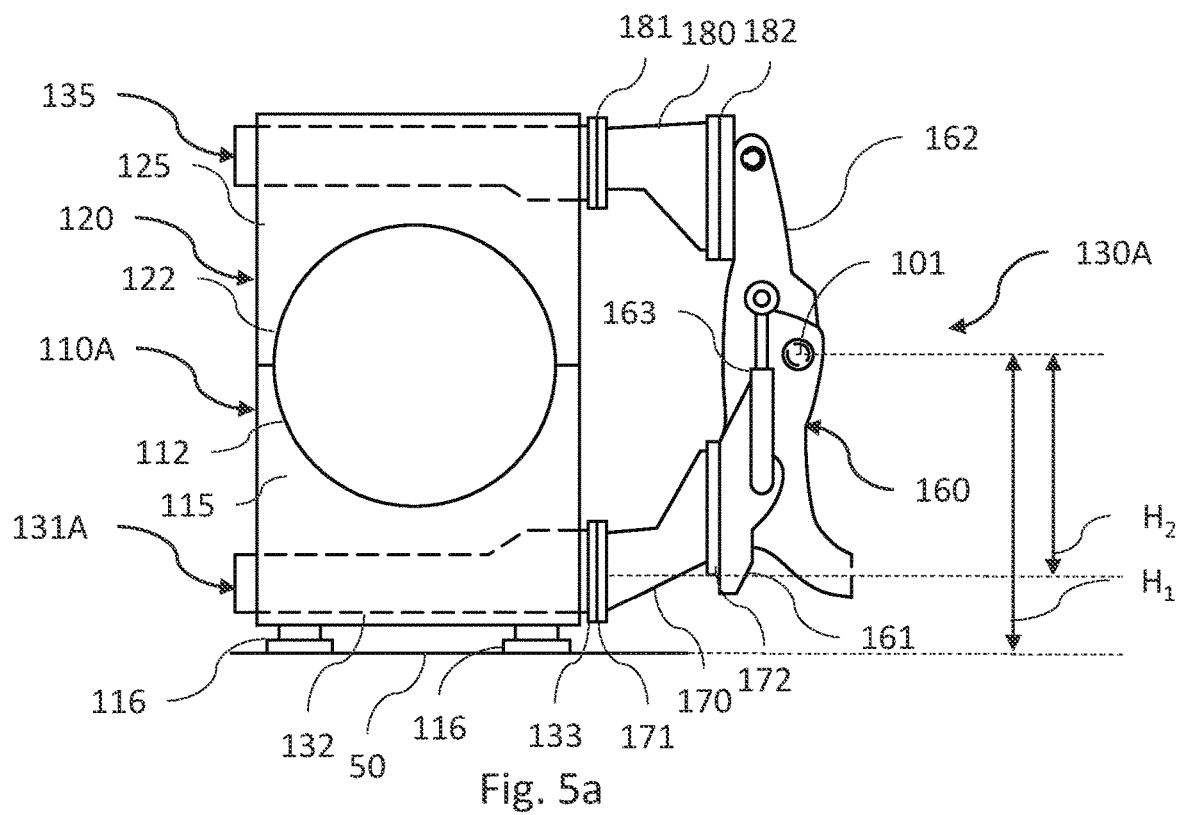
FIG. 5a is a schematic end view illustrating a root end of a first embodiment of a turning device in the closed position.
Figure 5B:
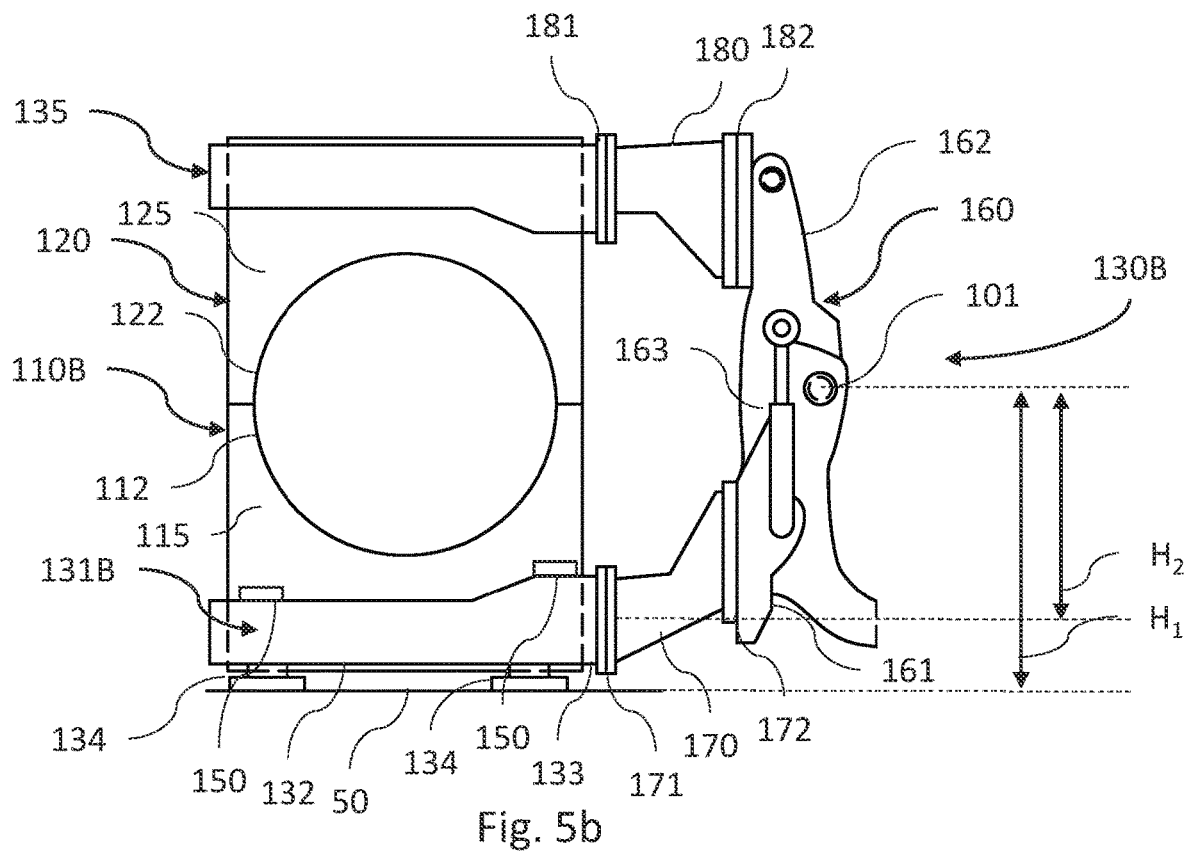
FIG. 5b is a schematic end view illustrating a root end of a second embodiment of a turning device in the closed position.

A first embodiment of a turning device 130A is shown in FIGS. 4 and 5a, and a second embodiment of a turning device 130B is shown in FIG. 5b.

As best seen in FIG. 5a, the turning device 130A of the first embodiment comprises a lower hinge element 131A, a lower elbow element 170, an upper hinge element 135, an upper elbow element 180, and a turning hinge 160 having a lower hinge part 161, an upper hinge part 162, and an actuator 163 configured for turning the lower and upper hinge parts 161, 162 relative to each other about the turning axis 101 and thereby the lower and upper blade shell part carriers 110, 120. Each turning hinge 160 is arranged between the blade shell part carriers in the open position as seen in FIG. 4 and at one side of the blade shell part carriers in the closed position as seen in FIG. 5a.

The lower hinge element 131 is in the form of a lower hinge beam and extends transversely to the turning axis 101 and the longitudinal axes of the carriers 110, 120 and comprises a first portion 132 extending under the support surface 112 of the lower blade shell part carrier 110 and a second portion 133 extending on a side of the lower blade shell part carrier 110. The second portion 133 of the lower hinge element 131 is attached to the lower elbow element 170 in the form of an elbow beam via a first lower bolted flange joint 171 and the lower elbow element 170 is attached to the lower hinge part 161 via a second lower bolted flange joint 172.

The upper hinge element 135 is in the form of an upper hinge beam and extends transversely to the turning axis 101 and the longitudinal axes of the carriers 110, 120 and above the support surface 122 of the upper blade shell part carrier 120 in the closed position as seen in FIGS. 5a-5b. The upper hinge element 135 is attached to the upper elbow element 180 in the form of an elbow beam via a first upper bolted flange joint 181 and the upper elbow element 180 is attached to the upper hinge part 162 via a second bolted flange joint 182.

A height $H_1$ between the turning axis 101 and the stationary surface 50 is predetermined to be 2.55 metres. A height H₂ between the turning axis 101 and a centre of the first lower bolted flange joint 171 is predetermined to be 1.925 metres.

In the first embodiment, the lower and upper hinge element 131, 135 are welded to the supporting frame 115, 125 of the respective blade shell part carriers 110, 120.

In the first embodiment, the method of turning from closed position to open position is performed as follows; the actuator is caused to move the lower hinge part 161 relative to the upper hinge part 162 about the turning axis 101. The lower hinge part 161 will not move relative to the stationary surface 50 since it is rigidly attached to the lower blade shell part carrier 110 through the lower elbow element 170 and the lower hinge element 131A, and the feet 116 of the lower blade shell part carrier 110 is secured to the stationary surface via anchor bolts, thus the upper hinge part 162 will begin to turn about the turning axis 101 and along with it the upper blade shell part carrier 120 due to the rigid attachment via the upper elbow element 180 and the upper hinge element 135. Once the turning method is complete, the blade shell part carriers 110, 120 will be positioned as shown in FIG. 3 and ready to receive a lay-up of blade shell parts to be moulded in the blade shell part carriers 110, 120. After moulding of the blade shell parts, the method of turning is reversed to bring the blade shell part carriers 110, 120 back to the closed position in order to finish the manufacture of the blade shell by gluing the leading and trailing edges of the blade shell parts.

In the first embodiment, the method of exchanging the turning system is performed by replacing the blade shell part carriers by different ones and providing turning devices comprising different hinge elements, different adapter elements, and potentially a different turning hinge, which are then assembled with the different sized blade shell part carriers by welding the hinge elements to the supporting frame of the respective blade shell part carrier and assembling the respective hinge elements, the adapter elements, and the hinge parts of the turning hinge by bolted joints.

The second embodiment of the turning device 130B shown in FIG. 5b differs from the first embodiment in that the lower hinge element 131B comprises feet 134 secured to the stationary surface 50 via anchor bolts and are assembled with the remaining parts of the turning device 130B similarly to the first embodiment. The lower hinge element 131B thus secures the turning hinge to stationary surface 50 during the turning method instead of the lower blade shell part carrier 110 acting as a counterweight.

Figure 6:
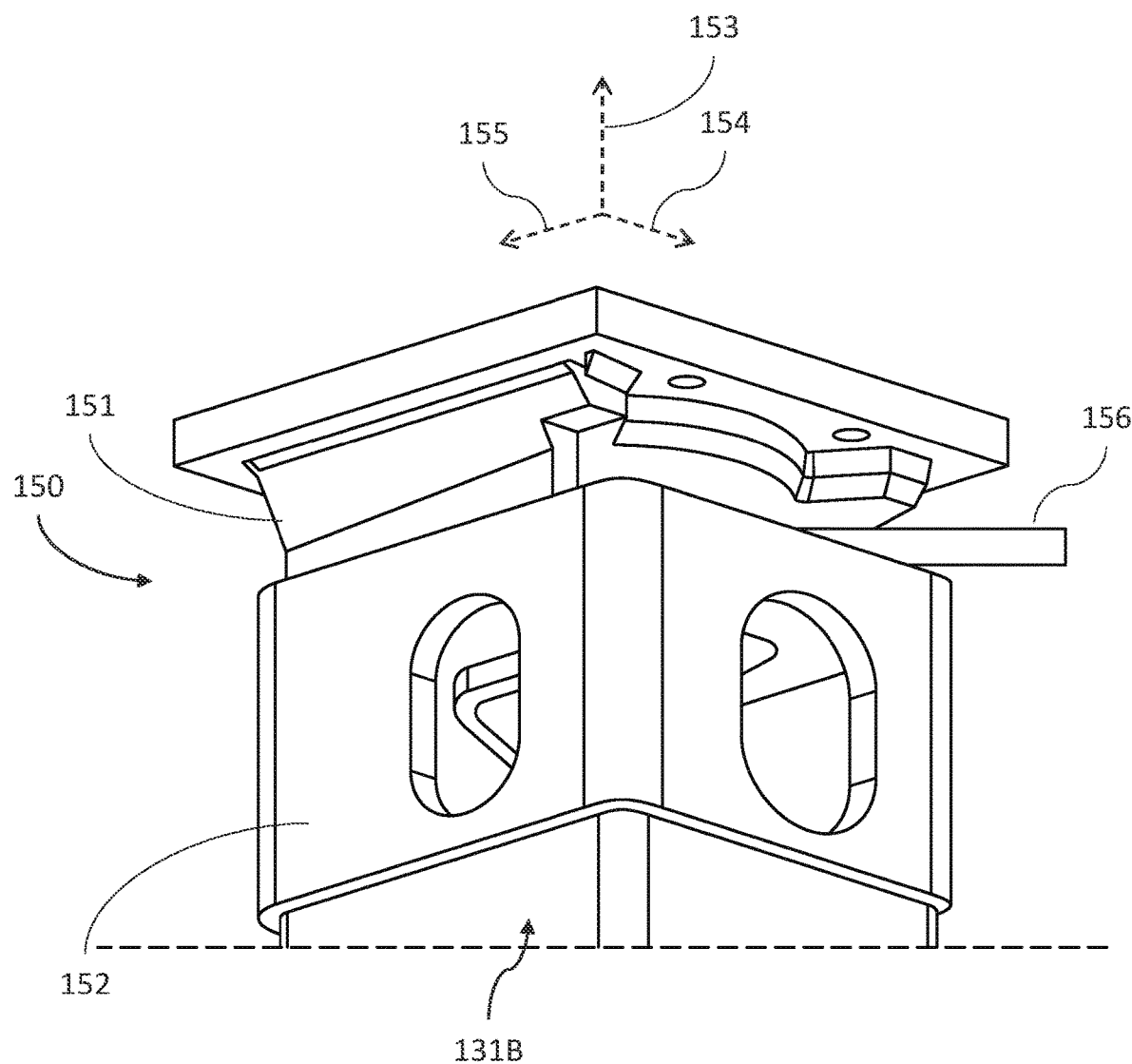
FIG. 6 is a schematic perspective view illustrating a detachable attachment interface between a lower hinge element and a lower blade part carrier.

The turning system 100 of the second embodiment can comprise a controller (not shown) and, at each turning device 130B as shown in FIG. 5a, a detachable attachment interface 150 with a first interface part 151 configured to be bolted to the lower blade shell part carrier 110B and a second interface part 152 forming part of the respective lower hinge element 131B as best seen in FIG. 6, wherein the first interface part and second interface part are configured to interlock upon lowering the first interface part 151 onto the second interface part 152 during assembly of the turning system 100. The attachment interface 150 comprises three actuators (not shown), which can be hydraulic or electric, configured to translationally displace the lower blade shell part carrier 110 up to 5-10 mm relative to the lower hinge element in three perpendicular directions 153, 154, 155. The controller is configured to control the displacement of the detachable attachment interface of each hinge element so that adjustment and levelling of the lower blade shell part carrier 110B can be performed by the turning system 100. The detachable attachment interface 150 further comprises a lever 156 configured to detach the attachment interface upon manipulation so that the lower blade shell part carrier 110 can be detached from the lower hinge element 131B.

Figures 7A, 7B:
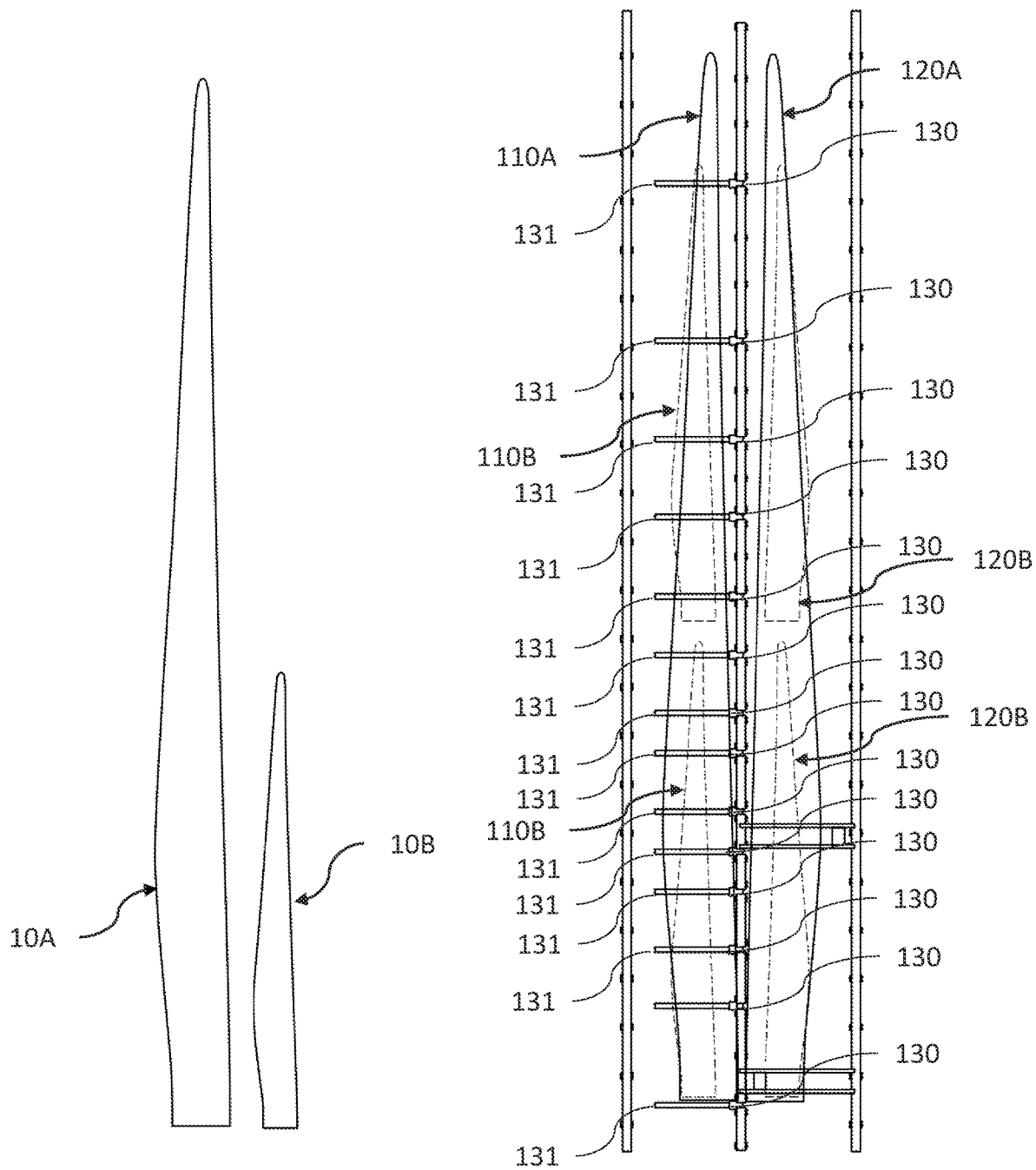

As illustrated in FIGS. 7a-7b, the turning system according to the second embodiment is advantageous for accommodating different blade lengths. Initially, the turning devices 130B of the turning system 100 are set up to handle blade shell part carriers 110, 120 for a relatively long wind turbine blade 10A as shown in FIG. 5b. The bolted flange joint 182 of upper elbow elements 180 is then detached from the upper hinge part 162, and the upper blade shell part carrier 120 along with the upper elbow elements 180 and the upper hinge elements 135 are removed. The first and second bolted flange joints 171, 172 are detached and the lower elbow element 170 is removed. The lower blade shell part carrier 110 is detached from the stationary surface 50 if it had been secured and is removed. The remaining parts are now the lower hinge elements 131B, and the turning hinges 160.

Blade shell part carriers for a second relatively short wind turbine blade 10B are then provided and the lower blade shell part carrier is placed on top of the lower hinge elements 131B either supported by the attachment interface or simply by the stationary surface 50. The lower blade shell part carrier is then levelled and the upper blade shell part carrier is placed on top of the lower blade shell part carrier and adjusted so their longitudinal axes 111, 121 are parallel to the turning axis 101 so that the blade shell part carriers are in their closed position. New lower elbow elements 170, upper elbow elements 180, and upper hinge beams 135 are provided and assembled to reach the setup shown in FIG. 5b. The turning system 100 can accommodate two sets of carriers for the second wind turbine blade as shown in FIG. 7b.

LIST OF REFERENCES 2 wind turbine
4 tower
6 nacelle
8 hub
10 blade
11 airfoil region
12 root region
13 transition region
12
14 blade tip
15 tip end
16 blade root
17 root end
18 leading edge
20 trailing edge
22 pressure side
24 suction side
40 shoulder
50 stationary surface
100 turning system
101 turning axis
110 lower blade shell part carrier
111 first longitudinal axis
112 support surface
113 tip portion
114 root portion
115 supporting frame
116 feet
120 upper blade shell part carrier
121 second longitudinal axis 122 support surface
123 tip portion
124 root portion
125 supporting frame
130 turning device
131 lower hinge element
132 first portion
133 second portion
134 feet
135 upper hinge element
150 detachable attachment interface
151 first interface part
152 second interface part
153 first direction
154 second direction
155 third direction
156 lever
160 turning hinge
161 lower hinge part
162 upper hinge part
163 actuator
170 lower elbow element
171 first lower joint
172 second lower joint
180 upper elbow element
181 first upper joint
182 second upper joint
$H_1$ turning axis height
$H_2$ first joint height

The invention claimed is:

1. A turning system for turning wind turbine blade shell part carriers between an open position and a closed position about a turning axis, comprising:
    a lower blade shell part carrier extending along a first longitudinal axis and having a support surface for receiving and supporting a lower wind turbine blade part;
    an upper blade shell part carrier extending along a second longitudinal axis and having a support surface for receiving and supporting an upper wind turbine blade part, the support surfaces of the lower and upper blade shell part carriers being able to receive a respective blade shell part in the open position and the support surface of the upper blade shell part carrier is turned over on the support surface of the lower blade shell part carrier in the closed position; and
    at least one turning device comprising each including:
        a lower hinge element, arranged at least partly under the support surface of the lower blade shell part carrier;
        turning hinge having a lower hinge part attached to the respective lower hinge element, an upper hinge part attached to the upper blade shell part carrier, and an actuator configured for turning the lower and upper hinge parts relative to each other about the turning axis; and
        means for securing the lower hinge element to a stationary surface.

2. The turning system according to claim 1, wherein said means for securing the lower hinge element comprises at least one foot configured to secure the turning hinge to the stationary surface when the upper and lower blade shell part carriers are turned between the open position and the closed position.

3. The turning system according to claim 1, wherein the at least one turning device further comprises a lower detachable elbow element attaching the lower hinge element to the lower hinge part, optionally the lower hinge element being attached to the detachable elbow element via a first joint and optionally the lower hinge part being attached to the detachable elbow element via a second joint.

4. The turning system according to claim 3, wherein a centre of the first joint and/or the second joint is located at a predetermined horizontal distance and/or a predetermined height from the turning axis.

5. The turning system according to claim 3, wherein the lower detachable elbow element comprises an elbow beam.

6. The turning system according to claim 1, wherein the lower blade shell part carrier is movable relative to the lower hinge element.

7. The turning system according to claim 1, wherein the at least one turning device further comprises a detachable attachment interface with a first interface part forming part of the lower blade shell part carrier and a second interface part forming part of the lower hinge element, wherein the first interface part and the second interface part are configured to detachably interlock.

8. The turning system according to claim 7, wherein the detachable attachment interface comprises at least one actuator configured for displacing the lower blade shell part carrier relative to the lower hinge element in at least one direction.

9. The turning system according to claim 8, wherein the at least one actuator is configured for displacing the lower blade shell part carrier relative to the lower hinge element in three perpendicular directions.

10. The turning system according to claim 1, wherein the turning axis is at a predetermined height from the stationary surface.

11. The turning system according to claim 10, wherein the predetermined height is in a range between 2 metres and 4 metres.

12. The turning system according to claim 1, wherein the at least one turning device is a plurality of turning devices spaced along the first longitudinal axis.

13. The turning system according to claim 1, wherein the upper blade shell part carrier is an upper mould for manufacturing a first wind turbine blade part, and
    wherein the lower blade shell part carrier is a lower mould for manufacturing a second wind turbine blade part.

14. The turning system according to claim 13, wherein the first wind turbine blade part comprises an upwind part of a wind turbine blade or a downwind part of the wind turbine blade, and
    wherein the second wind turbine blade part comprises an upwind part of the wind turbine blade or a downwind part of the wind turbine blade.

15. The turning system according to claim 1, wherein the lower hinge element of the at least one turning device comprises a beam.

16. A method for exchanging a first turning system for turning a first pair of blade shell part carriers about a first turning axis between an open position and a closed position with a second turning system for turning a second pair of blade shell part carriers about a second turning axis between the open position and closed position, the support surfaces of the blade shell part carriers being able to receive a respective blade shell part in the open position and the support surfaces of blade shell part carriers forming a continuous support surface in the closed position, the method comprising the steps of:
    providing the turning system according to claim 1, the upper and lower blade shell part carriers being a first pair of blade shell part carriers for supporting blade shell parts of a first blade length, the at least one hinge element being secured to the stationary surface under the lower blade shell part carrier, detaching the upper hinge part of the turning hinge from the upper blade shell part carrier, removing the first pair of blade shell part carriers, providing a second pair of blade shell part carriers including:
- a second lower blade shell part carrier having a support surface for receiving and supporting a lower wind turbine blade shell part for a wind turbine blade of a second blade length, and
- a second upper blade shell part carrier having a support surface for receiving and supporting an upper wind turbine blade shell part for a wind turbine blade of a second blade length, the second blade length being different from the first blade length, positioning the second lower blade shell part carrier over the lower hinge element of the at least one turning device, and attaching the upper hinge part of the turning hinge of the at least one turning device to the second upper blade shell part carrier.

17. The method according to claim 16, wherein the first turning axis of the first turning system and the second turning axis and the second turning system coincide at a predetermined height in the range of 2 metres to 4 metres.

18. A method of preparing a turning system for turning wind turbine blade shell part carriers between an open position and a closed position, the method comprising the steps of:

providing a turning system comprising:
- a lower blade shell part carrier having a support surface for receiving and supporting a lower wind turbine blade part,
- an upper blade shell part carrier having a support surface for receiving and supporting an upper wind turbine blade shell part, the support surfaces of the lower and upper blade shell part carriers being able to receive a respective blade shell part in the open position, and the support surface of the upper blade shell part carrier is turned over on the support surface of the lower blade shell part carrier in the closed position, at least one turning device comprising:
- a lower hinge element;
- a turning hinge having a lower hinge part, an upper hinge part, and an actuator configured for turning the lower and upper hinge parts relative to each other about a turning axis; and
- means for securing the lower hinge element to a stationary surface, securing the lower hinge element of the at least one turning device to the stationary surface, positioning the lower blade shell part carrier over the lower hinge element of the at least one turning device, attaching the lower hinge element to the lower hinge part of the turning hinge, and attaching the upper hinge part of the turning hinge to the upper blade shell part carrier so that the at least one turning hinge can move the blade shell part carriers between the open position and closed position.

19. The method according to claim 18, further comprising a step of:

levelling the lower blade shell part carrier, and optionally inserting one or more shims between the lower blade shell part carrier and the stationary surface.

20. The method according to claim 18, further comprising a step of:

placing the upper blade shell part carrier on the lower blade shell part carrier so the blade shell part carriers are in a closed position.

\* \* \* \* \*

UNITED STATES PATENT AND TRADEMARK OFFICE
CERTIFICATE OF CORRECTION

PATENT NO. : 11,794,379 B2
APPLICATION NO. : 17/786184
DATED : October 24, 2023
INVENTOR(S) : Maria De L. M. Arias, Rune Brøgger Hahn and Ivan Kaab Mosegaard It is certified that error appears in the above-identified patent and that said Letters Patent is hereby corrected as shown below:

In the Claims

Claim 1, Column 11, Line 47, please delete the phrase "at least one turning device comprising each including" and replace with "at least one turning device each including".

Claim 1, Column 11, Line 51, please delete the phrase "turning hinge having a lower hinge part attached to the" and replace with "a turning hinge having a lower hinge part attached to the".

Signed and Sealed this
Twenty-sixth Day of December, 2023

Katherine Kelly Vidal
*Director of the United States Patent and Trademark Office*